(12) United States Patent
Birke et al.

(10) Patent No.: US 8,292,013 B2
(45) Date of Patent: Oct. 23, 2012

(54) DRIVE SYSTEM FOR A MOTOR VEHICLE

(75) Inventors: Peter Birke, Glienicke/Nordbahn (DE); Michael Keller, Baden-Baden (DE)

(73) Assignees: Conti Temic Microelectronic GmbH, Nuremberg (DE); Temic Automotive Electric Motors GmbH, Berlin (DE)

( * ) Notice: Subject to any disclaimer, the term of this patent is extended or adjusted under 35 U.S.C. 154(b) by 519 days.

(21) Appl. No.: 12/089,062

(22) PCT Filed: Oct. 10, 2006

(86) PCT No.: PCT/DE2006/001762
§ 371 (c)(1),
(2), (4) Date: Apr. 3, 2008

(87) PCT Pub. No.: WO2007/048373
PCT Pub. Date: May 3, 2007

(65) Prior Publication Data
US 2008/0251304 A1    Oct. 16, 2008

(30) Foreign Application Priority Data

Oct. 28, 2005  (DE) .......................... 10 2005 052 864
Dec. 6, 2005   (DE) .......................... 10 2005 058 064

(51) Int. Cl.
*B60K 6/22* (2006.01)

(52) U.S. Cl. .................. 180/65.29; 180/65.27; 320/118; 320/127

(58) Field of Classification Search .................. 180/165, 180/65.21, 65.225, 65.24, 65.265, 65.275, 180/65.285, 65.29, 65.31, 68.5; 320/104, 320/116–123
See application file for complete search history.

(56) References Cited

U.S. PATENT DOCUMENTS

| | | | | |
|---|---|---|---|---|
| 5,828,201 A | * | 10/1998 | Hoffman et al. | 320/104 |
| 5,905,360 A | * | 5/1999 | Ukita | 320/118 |
| 5,998,960 A | * | 12/1999 | Yamada et al. | 320/104 |
| 6,081,095 A | * | 6/2000 | Tamura et al. | 320/118 |
| 6,137,250 A | * | 10/2000 | Hirano et al. | 318/376 |
| 6,184,656 B1 | * | 2/2001 | Karunasiri et al. | 320/119 |
| 6,276,472 B1 | * | 8/2001 | Takashima et al. | 180/65.21 |
| 6,329,772 B1 | * | 12/2001 | Ochiai et al. | 318/139 |
| 6,424,053 B1 | | 7/2002 | Wakashiro et al. | |
| 6,694,232 B2 | * | 2/2004 | Saito et al. | 701/22 |
| 7,126,312 B2 | * | 10/2006 | Moore | 320/157 |
| 7,416,039 B1 | * | 8/2008 | Anderson et al. | 180/165 |
| 7,492,160 B2 | * | 2/2009 | Bolz | 324/433 |
| 7,501,793 B2 | * | 3/2009 | Kadouchi et al. | 320/107 |
| 7,552,705 B2 | * | 6/2009 | Serkh et al. | 123/179.4 |
| 7,832,513 B2 | * | 11/2010 | Verbrugge et al. | 180/65.31 |
| 7,857,081 B2 | * | 12/2010 | Kishimoto | 180/65.27 |
| 2001/0009147 A1 | * | 7/2001 | Takashima et al. | 123/406.14 |

(Continued)

FOREIGN PATENT DOCUMENTS

DE          102 13 105          7/2002

*Primary Examiner* — John Walters
*Assistant Examiner* — James Triggs

(57) ABSTRACT

The invention relates to a drive system for a motor vehicle comprising an internal combustion engine and at least one electric machine, said vehicle also being provided with at least one vehicle electric system for electric power supply. In addition, the drive system is provided with at least one energy accumulator with several energy accumulator cells and a control assembly for controlling different operating modes of the motor vehicle.

8 Claims, 1 Drawing Sheet

U.S. PATENT DOCUMENTS

| | | | |
|---|---|---|---|
| 2003/0217876 A1* | 11/2003 | Severinsky et al. | 180/65.2 |
| 2003/0236599 A1* | 12/2003 | Saito et al. | 701/22 |
| 2004/0137313 A1* | 7/2004 | Jaura et al. | 429/62 |
| 2004/0217736 A1* | 11/2004 | Bischoff | 320/119 |
| 2005/0264263 A1* | 12/2005 | Tsenter | 320/128 |
| 2007/0080664 A1* | 4/2007 | Maguire et al. | 320/116 |
| 2007/0290674 A1* | 12/2007 | Bolz | 324/119 |
| 2008/0271937 A1* | 11/2008 | King et al. | 180/165 |

* cited by examiner

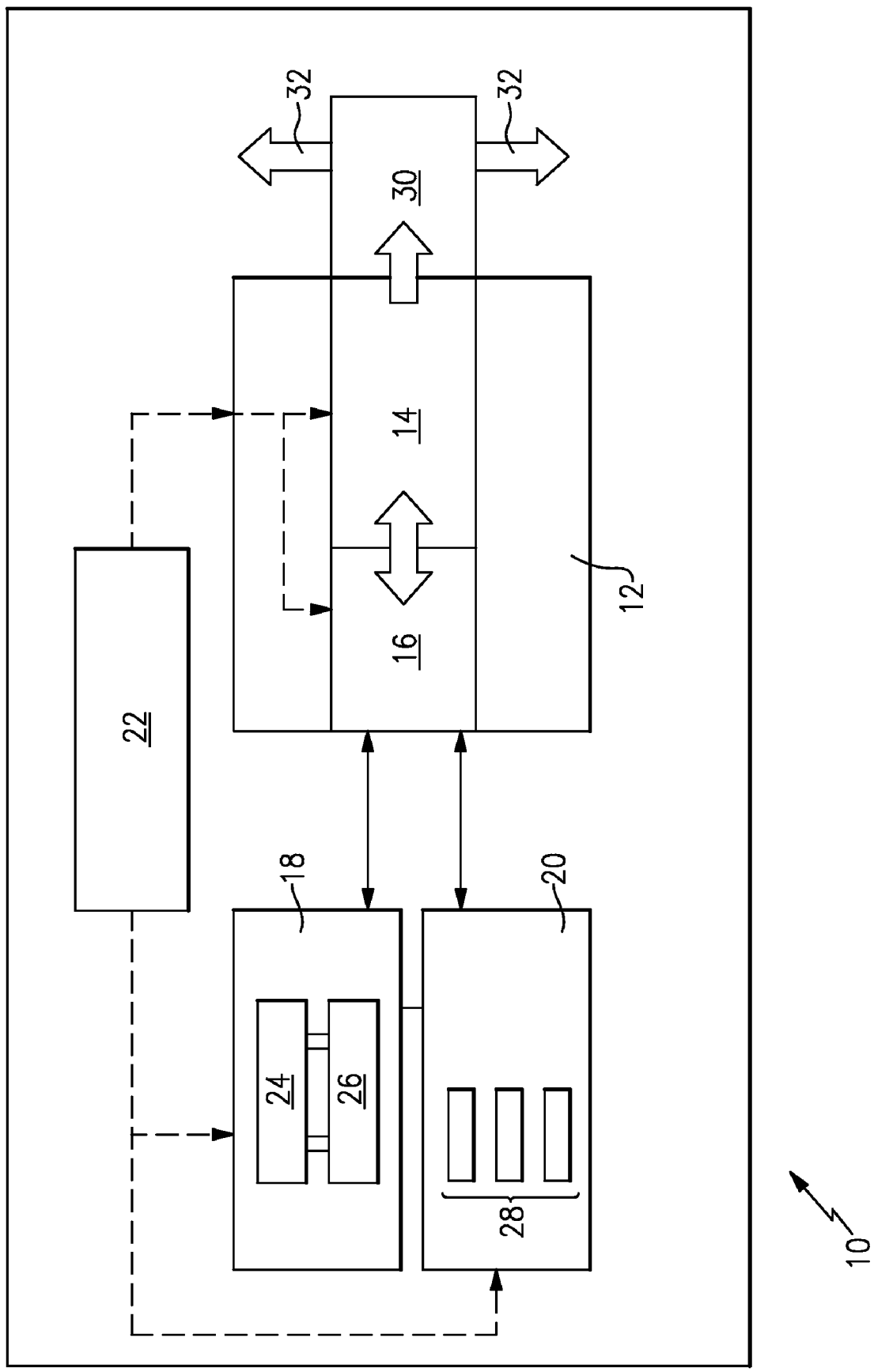

US 8,292,013 B2

DRIVE SYSTEM FOR A MOTOR VEHICLE

BACKGROUND OF THE INVENTION

The present invention relates to a drive system for a motor vehicle, in particular a motor vehicle with hybrid drive.

Hybrid drives are the combination of different drive principles or different energy sources for a drive task within an application. Motor vehicles with hybrid drive, also called hybrid vehicles, comprise for example an internal combustion engine and an electric machine. The electric machine is usually embodied as a starter-generator and/or an electric drive. As a starter generator it replaces the normally available starter and the generator. When embodied as an electric drive an additional torque, i.e. an acceleration torque, to advance the vehicle can be contributed by the electric machine. In its function as a generator it enables a recuperation of the brake energy. Furthermore, hybrid vehicles comprise at least one energy accumulator. The energy from the energy accumulator can be used for starting the internal combustion engine, for the electric consumers in the vehicle and for acceleration processes. During driving the energy accumulator is fed via the generator by the internal combustion engine. In addition, the energy accumulator is charged by energy recuperation during braking. Via a control electronics the different modes are controlled, inter alia as to whether energy is to be drawn from or supplied to the energy accumulator.

From EP 0 913 287 A2 a hybrid vehicle is known, which comprises a machine to advance the hybrid vehicle. The machine has an output shaft, a power transmission means for transferring an output power of the machine from its output shaft to the driving wheels as well as an electric motor for supplying a support output power for supporting the output power of the machine by the power transmission means to the driving wheels. Furthermore, a current energy storing means is provided to store electric energy and to excite the electric motor and a vehicle operation control means to control/regulate the operation of the hybrid vehicle with the machine and the electric motor. The vehicle operation controlling means comprises a means for controlling/regulating the electric motor for producing the support output power, to be able to start the hybrid vehicle with the electric energy, which is supplied to the electric motor by the current energy storage means, while the machine coasts, if the electric energy quantity stored in the current energy storage means is larger than a given value. Finally, means are provided to control/regulate the machine, in order to effect that the output shaft produces an output power for starting the hybrid vehicle, while the electric motor is excited, if the electric energy quantity stored in the current energy storage means is smaller than the give value.

It is the object of the invention to further embody in advantageous manner a drive system for a motor vehicle according to the state of the art.

SUMMARY OF THE INVENTION

This object is achieved by a drive system for a motor vehicle with an internal combustion machine and at least one electric machine. At least one electric system is provided for the electric power supply, as well as at least one energy accumulator, having several energy accumulator cells, and a control arrangement for controlling different operating modes of the motor vehicle. The vehicle has the following operating modes:
  acceleration of the motor vehicle with internal combustion machine and/or electric machine,
  smooth driving of the motor vehicle with internal combustion machine and/or electric machine,
  operation of the electric machine as a generator for producing electric energy (recuperation),
  feeding of the electric energy, which is produced by the electric machine, into at least one of the vehicle electric systems,
  conversion of the voltage available in the vehicle electric system to a voltage of a further vehicle electric system, and
  symmetrizing or balancing of the energy accumulator cells of the energy accumulator.

Advantageous embodiments of the invention ensue from the dependent claims and the further description.

The drive system according to invention comprises an internal combustion engine and an electric machine, which can be used inter alia also as a starter-generator. The electric machine is an electric induction machine, which fulfills the starter-generator-function and which comprises at least one inverter for producing the voltages and/or currents of variable frequency, amplitude and/or phase needed for the magnetic fields of the electric machine, wherein in particular the electric machine also starts the combustion engine in merge from a standing start.

Any type of machine for rotary motions, which can be operated both as an electric motor as well as an electric generator, is an electric machine in terms of the application.

The inverter can produce voltages and/or currents of freely selectable frequency, amplitude and/or phase needed for the magnetic fields.

The hybrid vehicle comprises various conditions and/or operating modes, which are described in detail in the following.

BRIEF DESCRIPTION OF THE DRAWING

FIG. 1 is a schematic illustration of an example drive system for a motor vehicle.

DETAILED DESCRIPTION

A disclosed drive system 12 for a motor vehicle 10 includes an internal combustion engine 14 and an electric machine 16. The electric machine 16 is in electric communication with an electric system 18 and an energy accumulator 20. A control arrangement 22 controls operation of the drive system 12 in addition to the electrical system 18 and the energy accumulator 20. The electric system 18 includes at least one high voltage system 24 and at least one low voltage system 26. The energy accumulator 20 includes a plurality accumulator cells 28 for storing energy. The drive system 12 drives a transmission 30 or other mechanical device for outputting power to drive wheels of the motor vehicle 10 as is schematically shown at 32.

Since with conventional motor vehicles, into which a hybrid drive is to be built, mostly only a vehicle voltage system for the electric supply with 12 Volt is available, however, an energy accumulator comprises or requires a far higher voltage, for example 240 Volt, at least one high- and at least one low-voltage electric system is present. In order to achieve a conversion between the high-voltage system and the low-voltage system, indirect inverters are provided, which are necessary for the purpose of increasing and reducing the voltage between the voltage systems. It is only by means of these indirect inverters that energies can be transferred from one vehicle voltage system into the other. Thus, energy can be delivered from the low-voltage electric system into the high-voltage electric system and from the high-voltage electric system into the low-voltage electric system.

Furthermore, it is provided that by means of an inverter the electric machine is embodied such that it is able to deliver 220 Volt alternating current or 380 Volt three-phase current with usual power frequency, for example 50 or 60 Hz. The supply of the inverter can be effected from a dc voltage intermediate circuit. A motor vehicle equipped in such way permits the supply of standard electric power supply units and thus represents a mobile mains current generator, which can be used advantageously e.g. with outside works or during camping.

The conversion of electric energy from the intermediate circuit to alternating current can serve in advantageous manner also for the supply of an ac voltage electric system of the vehicle. Such an ac voltage electric system has the advantage that at the individual consumers from the vehicle electric system voltage any voltages adapted to the respective consumer can be produced by means of transformers. In return, however, it also is possible to charge the energy accumulator with energy via a standard mains supply to the 220 Volt socket, which is usually available, or also via a three-phase current supply. This is particularly advantageous, as in this case the motor vehicle, if not operated, or its energy accumulator, respectively, can be charged via the power supply system of a household.

A start/stop control arranged in the motor vehicle preferably prompts an automatic stopping of the internal combustion engine, if a stop condition is fulfilled. Different conditions alone or in sub-combination can be used for definition as a stop condition, such as for example no-load, overrun, idle running, standstill of the vehicle, combustion engine is declutched, no gear is engaged, the service brake or parking brake is applied, actuation of a stop switch.

In cases, such as in particular when actuating the accelerator pedal, releasing the service or parking brake, actuating the coupling, touching or moving a gear switch lever, engaging a gear, operating a start switch, automatically via the start control propulsion of the vehicle is operated. Depending on the force exerted onto the accelerator pedal the acceleration process of the vehicle is operated according to the state of the accelerator pedal via the control unit, which in particular in a control arrangement is integrated for controlling the conditions of the vehicle.

The motor vehicle with hybrid drive can be accelerated exclusively with the internal combustion engine. At the same time the vehicle can be braked in the overrun condition via the internal combustion engine.

However, it is also possible to accelerate the vehicle exclusively with the electric machine. For this purpose, the electric machine is supplied with current according to the desired output. In this case the vehicle is put into motion exclusively operated by the electric machine.

It is also possible to operate an acceleration of the vehicle in combination between the internal combustion engine and the electric machine. In particular in the so-called boost operation the electric machine is connected in addition to and parallel to the internal combustion engine. This results in a particularly good acceleration of the vehicle.

Furthermore, an operating mode of the motor vehicle is that a smooth driving is enabled exclusively with operating the electric machine and/or with operating the internal combustion engine. If smooth driving is effected with the internal combustion engine, at the same time the electric machine can be operated as a generator and the electric energy thus gained can be transferred into the different electric systems in the vehicle and can be fed there into the respective energy accumulators.

In particular when recuperating, i.e. in that case, in which the electric machine serves as a generator to produce current, the special advantages of the hybrid drive are applied. In the recuperation phase the vehicle is no longer braked via the brake, but the electric machine functions as a generator and the energy, thus resulting from the generator operation of the electric machine, which the generator delivers, serves for braking the vehicle. In a special driving situation it is also possible to use the electric machine as a kind of eddy-current brake and to thus achieve an additional deceleration of the vehicle. Here it is advantageous that via this deceleration there is no wear of the normally usual brakes.

Furthermore, an operating mode or of a vehicle condition is that when operating the electric machine as a drive or when as a generator, respectively, the energy is delivered from one of the vehicle voltage systems to the machine or from the electric machine, which works as generator, into the vehicle voltage systems, respectively. Further, for this purpose converters are provided, which transfer the energy delivered by the electric machine to the voltage level of the respective low- or high-voltage system. A 12-Volt system or a 24-Volt system can be referred to as a low-voltage system and any other network, which is operated over 60 Volt, can be referred to as a high-voltage system. Furthermore, via the converters it is possible to transfer the energies from the individual vehicle electric systems.

For storing energy in systems, in which for short period of times high electric currents are required, energy accumulators with a high energy density are applied to an increasing degree, in order to provide for example the high electric output needed for the starting process. The energy accumulator comprises several individual energy accumulator cells, which are connected in series, in order to achieve the required total voltage. It has now been discovered that such series connections of energy accumulator cells can result in asymmetric charge states. To maintain operability and longevity of the energy accumulator and the energy accumulator cells, resp., the individual cells must be brought to an almost identical voltage level within the energy accumulator, i.e. the charging voltages of the individual cells are adapted occasionally to each other, i.e. are symmetrized and balanced, respectively. If such symmetrizing or balancing charge was not effected, this might results for example even in negative voltages at individual energy accumulator cells, which would lead to the fact that this cell would be destroyed. Further, such a drifting apart of the cells can lead to overload and degeneration of individual cells and possibly even to safety risks.

Advantageously, energy accumulators or energy accumulator cells are nickel-metal-hydride-batteries (NiMH) or lithium-ion-batteries (Li-ions).

The probably most important special condition for the energy accumulator, in particular the NiMH batteries or Li-ion batteries, is the symmetrizing or balancing charge of the individual cells. This condition can be performed periodically, for example in case of NiMH batteries, for example half-yearly in form of a service interval.

However, in advantageous manner the symmetrizing or balancing charge is performed during driving. The balancing charge in combination with other operating modes or driving conditions leads to a crucial service life extension and improvement of the efficiency via the aging of the battery.

Preferably, the symmetrizing or balancing charge is carried in a vehicle condition, in which the vehicle either moves smoothly by means of an internal combustion engine, or is standing, preferably if the vehicle is parked. In particular it must be ensured that during a longer period of time no energy is removed or fed into the energy accumulator or the energy accumulator cells, respectively.

This is ensured in particular by the fact that on the one hand a cruise control is used as an indication. When activating the cruise control it can be assumed that the vehicle moves over a longer period of time with continuous speed. When activating the cruise control the electric machine is thus switched off and is put out of action. The energy accumulator is then symmetrized or balanced, resp. The control unit controls the symmetrizing or balancing charge, resp.

Further, in particular in the case of NiMH batteries, as well as of Li-ion batteries the problem appeared that with the decrease of temperature, i.e. the ambient temperature, below a threshold value, the ability of the battery to release energy is reduced. To avoid this it is provided that a special element, preferably a special heating resistor is provided, which is able to convert the electric energy almost completely into heat. This special element is activated, if a given temperature value for the ambient temperature is fallen below, in order to bring the battery to a minimum temperature level. This then enables the energy accumulator of the vehicle to improve the necessary energy, which is available in the energy accumulator, which however, cannot be retrieved because of the small temperatures and to thus extend also the service life of the battery. It has proven to be advantageous to initiate this process as soon as the vehicle is unlocked.

The invention claimed is:

1. A drive system for a motor vehicle having an internal combustion machine and at least one electric machine, wherein in the vehicle at least one electric system is provided for the electric power supply, as well as at least one energy accumulator, which comprises several energy accumulator cells, the drive system comprising:
 a control arrangement for controlling different operating modes of the motor vehicle, wherein the following operating modes of the vehicle are provided:
 acceleration of the motor vehicle with at least one of the internal combustion machine and the electric machine;
 smooth driving of the motor vehicle with at least one of the internal combustion machine and the electric machine;
 operation of the electric machine as a generator for producing electric energy;
 feeding of the electric energy, which is produced by the electric machine, into at least one of the vehicle electric systems;
 conversion of the voltage available in the vehicle electric system to a voltage of a further vehicle electric system; and
 symmetrizing or balancing of the energy accumulator cells of the energy accumulator while the motor vehicle is moving under power of the internal combustion machine, wherein the symmetrizing or balancing is initiated responsive to activation of a cruise control.

2. A drive system for a motor vehicle according to claim 1, wherein the operating mode symmetrizing or balancing of the energy accumulator cells of the energy accumulator is performed parallel to operating the internal combustion machine at a continuous fixed speed.

3. A drive system for a motor vehicle according to claim 1, wherein the operating mode symmetrizing or balancing of the energy accumulator cells of the energy accumulator is performed parallel to the operating mode of smooth driving.

4. A drive system for a motor vehicle according to claim 1, wherein the motor vehicle comprises at least one low-voltage electric system and one high-voltage electric system.

5. A drive system for a motor vehicle according to claim 4, wherein the acceleration of the motor vehicle with an internal combustion machine and electric machine is embodied as a boost function.

6. A drive system for a motor vehicle according to claim 4, wherein the low-voltage electric system is a 12-Volt-system and/or a 24-Volt-system and that the high-voltage electric system is a voltage system embodied for voltages higher than 60 Volt.

7. A drive system for a motor vehicle according to claim 1, wherein heating of the energy accumulator or the energy accumulator cells, respectively, is effected, if an ambient temperature falls below a given threshold value.

8. A drive system for a motor vehicle according to claim 1, wherein the energy accumulator cells are nickel-metal-hydride-batteries or lithium-ion-batteries.

* * * * *